United States Patent
Shimada et al.

(10) Patent No.: US 9,625,030 B2
(45) Date of Patent: Apr. 18, 2017

(54) AUTOMATIC TRANSMISSION CONTROLLER

(71) Applicant: JATCO Ltd, Fuji-shi, Shizuoka (JP)

(72) Inventors: Masaru Shimada, Shizuoka (JP); Hideharu Yamamoto, Fujinomiya (JP)

(73) Assignee: JATCO Ltd, Fuji-Shi (JP)

( * ) Notice: Subject to any disclaimer, the term of this patent is extended or adjusted under 35 U.S.C. 154(b) by 1178 days.

(21) Appl. No.: 13/649,625

(22) Filed: Oct. 11, 2012

(65) Prior Publication Data
US 2013/0098728 A1 Apr. 25, 2013

(30) Foreign Application Priority Data
Oct. 24, 2011 (JP) ................................. 2011-232847

(51) Int. Cl.
*F16D 25/12* (2006.01)
*F16H 57/027* (2012.01)
*F16H 61/02* (2006.01)
*F16D 48/02* (2006.01)
(Continued)

(52) U.S. Cl.
CPC ............ *F16H 61/02* (2013.01); *F16D 25/14* (2013.01); *F16H 57/027* (2013.01); *F16H 61/00* (2013.01); *F16D 25/0638* (2013.01); *F16H 2061/004* (2013.01)

(58) Field of Classification Search
CPC ............ F16H 2061/004; F16H 57/027; F16H 61/4174; F16H 61/02; F16H 61/0202; F16H 61/0251; F16H 61/0262; F15B 21/044; F16D 25/063; F16D 25/0635; F16D 25/0638; F16D 48/02; F16D 48/0206;
(Continued)

(56) References Cited

U.S. PATENT DOCUMENTS 5,928,108 A * 7/1999 Takiguchi ............... F16H 61/04
475/117
6,305,521 B1* 10/2001 Hall, III ................ B60T 17/222
192/85.41
(Continued)

FOREIGN PATENT DOCUMENTS

JP 2002243026 A * 8/2002
JP 2007-205518 A   8/2007
JP 2008064319 A * 3/2008

*Primary Examiner* — Terry Chau
(74) *Attorney, Agent, or Firm* — Foley & Lardner LLP

(57) ABSTRACT

An automatic transmission is provided with a frictional engagement member that is operated by hydraulic pressure for shifting the automatic transmission, and includes an air vent opening. An automatic transmission controller includes a pressure regulator and a control section. The pressure regulator regulates the hydraulic pressure in response to a hydraulic pressure control signal. The control section performs an air vent operation of venting air from the frictional engagement member through the air vent opening. The air vent operation includes: a preliminary operation of setting the hydraulic pressure control signal to a preliminary pulse indicative of a preliminary value of pressure, wherein the preliminary value is lower than a normal value of pressure; and a normal operation of setting the hydraulic pressure control signal to a normal pulse indicative of the normal value, wherein the normal pulse follows the preliminary pulse.

4 Claims, 3 Drawing Sheets

(51) Int. Cl.
*F16H 61/00* (2006.01)
*F16D 25/0638* (2006.01)

(58) Field of Classification Search
CPC ........ F16D 48/06; F16D 48/062; F16D 55/40; F16D 25/14; F16D 25/12
See application file for complete search history.

(56) References Cited

U.S. PATENT DOCUMENTS

| | | | |
|---|---|---|---|
| 6,814,689 B2* | 11/2004 | Horiguchi | F16H 61/0021 477/157 |
| 7,585,242 B2* | 9/2009 | Endo | F16H 61/0213 475/117 |
| 7,841,457 B2* | 11/2010 | Crafton | F16H 57/027 184/6.23 |
| 7,912,617 B2* | 3/2011 | Wright | F16H 61/0202 192/109 F |
| 9,523,397 B2* | 12/2016 | Uehara | F16D 25/08 |

* cited by examiner

AUTOMATIC TRANSMISSION CONTROLLER

BACKGROUND OF THE INVENTION

The present invention relates to an automatic transmission controller for venting air from a frictional engagement member of an automatic transmission.

Japanese Patent Application Publication No. 2007-205518 discloses a technique for venting air from a first frictional engagement member of an automatic transmission by applying the first frictional engagement member and releasing a second frictional engagement member of the automatic transmission, wherein the first frictional engagement member is released and the second frictional engagement member is applied when in P range (parking range). This air vent is implemented by repeatedly supplying hydraulic pressure to the frictional engagement member until a time period for which the hydraulic pressure is supplied to the first frictional engagement member reaches a predetermined reference period of time, thereby venting air that remains in a hydraulic circuit system configured to supply hydraulic pressure to the frictional engagement members.

SUMMARY OF THE INVENTION

It is desirable to provide an automatic transmission controller capable of venting air remaining in a hydraulic circuit system configured to supply hydraulic pressure to frictional engagement members of an automatic transmission, in a reliable manner by which the air is smoothly vented through an air vent opening.

According to one aspect of the present invention, an automatic transmission controller for an automatic transmission provided with a frictional engagement member, wherein the frictional engagement member is configured to be operated by hydraulic pressure for shifting the automatic transmission, and includes an air vent opening, the automatic transmission controller comprises: a pressure regulator configured to regulate the hydraulic pressure in response to a hydraulic pressure control signal; and a control section configured to set the hydraulic pressure control signal, and perform an air vent operation of venting air from the frictional engagement member through the air vent opening, wherein the air vent operation includes: a preliminary operation of setting the hydraulic pressure control signal to a preliminary pulse indicative of a preliminary value of pressure, wherein the preliminary value is lower than a normal value of pressure; and a normal operation of setting the hydraulic pressure control signal to a normal pulse indicative of the normal value, wherein the normal pulse follows the preliminary pulse.

According to another aspect of the present invention, an automatic transmission control method for an automatic transmission provided with a frictional engagement member, wherein the frictional engagement member is configured to be operated by hydraulic pressure for shifting the automatic transmission, and includes an air vent opening, wherein the automatic transmission is provided with a pressure regulator configured to regulate the hydraulic pressure in response to a hydraulic pressure control signal, the automatic transmission control method comprises: performing by a controller an air vent operation of venting air from the frictional engagement member through the air vent opening, wherein the air vent operation includes: a preliminary operation of setting the hydraulic pressure control signal to a preliminary pulse indicative of a preliminary value of pressure, wherein the preliminary value is lower than a normal value of pressure; and a normal operation of setting the hydraulic pressure control signal to a normal pulse indicative of the normal value, wherein the normal pulse follows the preliminary pulse.

DETAILED DESCRIPTION OF THE INVENTION

Figure 1:
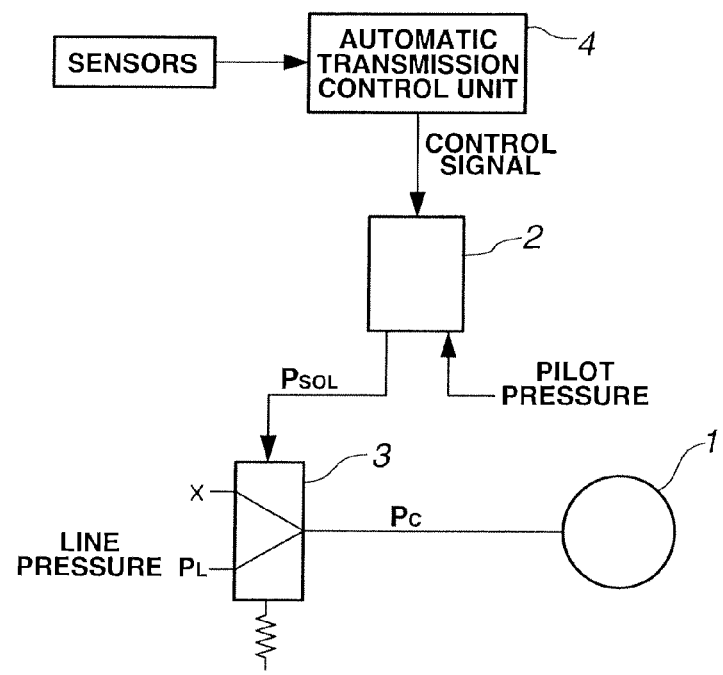
FIG. 1 is a system diagram showing system configuration of an automatic transmission control system for an automatic transmission, which is provided with an automatic transmission controller according to an embodiment of the present invention.

FIG. 1 shows system configuration of an automatic transmission control system for an automatic transmission, which is provided with an automatic transmission controller according to an embodiment of the present invention. The automatic transmission includes a frictional engagement member 1, a solenoid valve 2, a control valve 3, and an automatic transmission control unit 4. Frictional engagement member 1 is configured to be operated to shift the automatic transmission and establish transmission gear ratios between an input side and an output side of the automatic transmission. Solenoid valve 2 is configured to supply a signal pressure to control valve 3. Control valve 3 is configured to regulate hydraulic pressure supplied to frictional engagement member 1, based on the signal pressure supplied from solenoid valve 2. Automatic transmission control unit 4 is configured to output a hydraulic pressure control signal or command signal to solenoid valve 2.

Frictional engagement member 1 is a hydraulic multi-plate clutch, hydraulic multi-plate brake, etc., which is controlled during a transient phase of gearshift, to be applied and released selectively by hydraulic pressure referred to as engagement member pressure Pc which is supplied from control valve 3.

Solenoid valve 2 receives input of a pilot pressure, which is maintained at a constant level, and is generated by a pilot valve not shown, and produces a solenoid pressure Psol based on the pilot pressure under application of the hydraulic pressure control signal in the form of a solenoid current such as a duty drive current having a frequency of 800 Hz or the like, which is supplied from automatic transmission control unit 4, and supplies solenoid pressure Psol to control valve 3.

Control valve 3 is a pressure-regulator spool valve, which receives input of solenoid pressure Psol as an operation signal pressure from solenoid valve 2, and receives input of a line pressure Pl as a base pressure from a line pressure control valve not shown, and regulates engagement member pressure Pc supplied to frictional engagement member 1. Control valve 3 controls the engagement member pressure Pc in a manner that engagement member pressure Pc increases as solenoid pressure Psol increases.

Automatic transmission control unit 4 receives input of sensor signals from an oil temperature sensor, an engine speed sensor, a throttle sensor, a turbine speed sensor, a vehicle speed sensor, and other sensors, and input of switch signals from various switches, and estimates vehicle driving condition depending on the input signals, and produces a suitable hydraulic pressure control signal based on the estimated vehicle driving condition, and outputs the hydraulic pressure control signal to solenoid valve 2.

Automatic transmission control unit 4 is configured to perform a shift control, outputting a shift start signal in response to each event that an operating point of the vehicle, which is defined by throttle opening and vehicle speed, crosses an upshift line or downshift line on a prepared shift schedule map. Automatic transmission control unit 4 calculates the hydraulic pressure control signal indicative of hydraulic pressure values during transient phases of gearshift and the hydraulic pressure control signal during slipping engagement control, based on the shift start signal, and change of transmission gear ratio estimated by turbine speed and vehicle speed and others. Automatic transmission control unit 4 includes an air vent control section for performing an air vent operation of venting air from a hydraulic circuit system for supplying hydraulic pressure to frictional engagement member 1, when a predetermined condition is satisfied. The air vent operation may be performed when the automatic transmission is shipped from a factory, by supplying the solenoid valve 2 with a hydraulic pressure control signal from an inspector or the like in the factory. The air vent operation is implemented by outputting a series of pulses indicative of hydraulic pressure command values in the form of the hydraulic pressure control signal.

Figure 2:
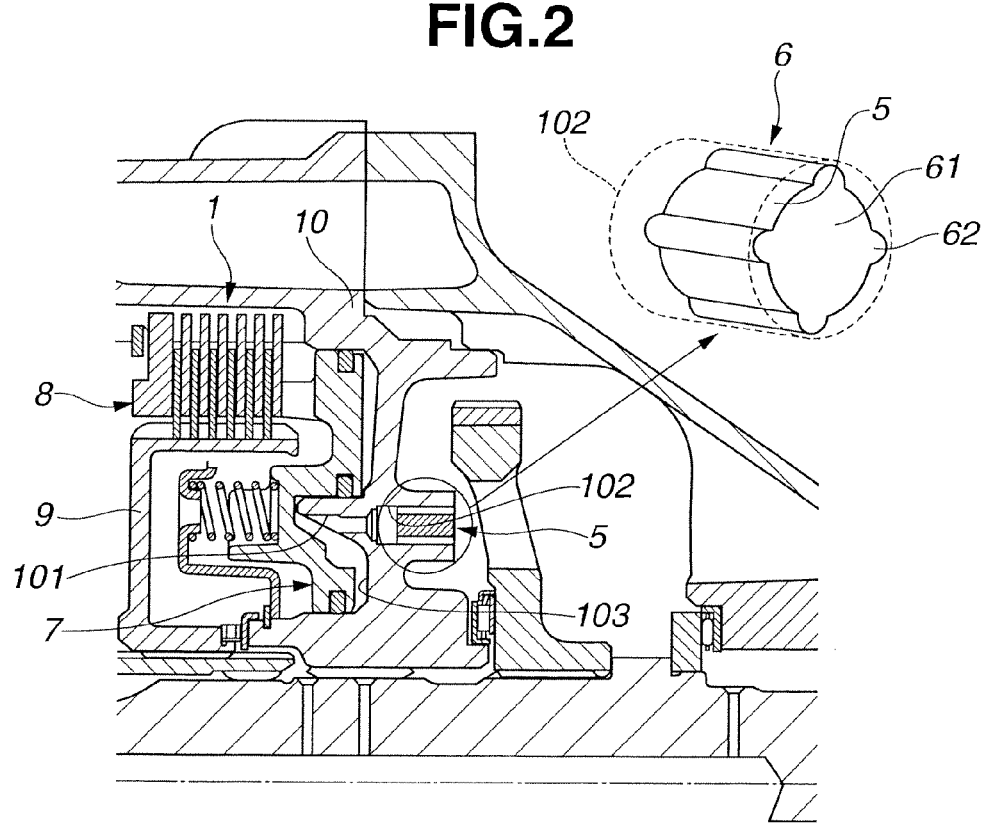
FIG. 2 is a schematic cross-sectional view of part of the automatic transmission, showing a frictional engagement member from which air is to be vented, and surroundings of the frictional engagement member.

FIG. 2 is a schematic cross-sectional view of part of the automatic transmission, showing the frictional engagement member 1 from which air is to be vented, and surroundings of frictional engagement member 1. In this embodiment, frictional engagement member 1 is a brake constituting the automatic transmission, and is mounted in a transmission housing 10. Frictional engagement member 1 is provided with a cylindrical part 103 and a piston 7. Cylindrical part 103 is formed in a vertical wall of a transmission housing 10. Piston 7 is mounted in cylindrical part 103 for sliding longitudinally of cylindrical part 103. The combination of piston 7 and cylindrical part 103 forms one cylinder chamber at a radially outside position and another cylinder chamber at a radially inside position. However, the combination of piston 7 and cylindrical part 103 may be alternatively configured to form only one such cylinder chamber. Piston 7 is configured to press multiple plates 8 of frictional engagement member 1, and thereby fixedly couples a rotor 9 to transmission housing 10.

When mounted on the vehicle, an air vent passage 101 and an air vent member insertion hole 102 are formed above the radially inside cylindrical part 103. Air vent passage 101 extends in the axial direction of transmission housing 10 through the vertical wall of transmission housing 10. Air vent member insertion hole 102 is hydraulically connected to air vent passage 101, wherein an air vent member 6 is press-fitted into air vent member insertion hole 102. Air vent member 6 includes a central part 61 and four projections 62. Central part 61 has a cylindrical form as shown in FIG. 2. Four projections 62 are formed at the outer periphery of central part 61 and evenly spaced in the circumferential direction of central part 61. Between the inner peripheral surface of air vent member insertion hole 102 and the outer peripheral surface of air vent member 6 is defined a space because of the provision of projections 62, wherein this space serves as an air vent opening 5 to vent air. The air vent opening 5 is sized to allow air to be easily and fully vented to the outside, but suppress working oil from flowing to the outside, and thereby cause little effect on the hydraulic pressure control of frictional engagement member 1. This can be achieved because the viscosity of oil is higher than that of air.

Figure 3A:
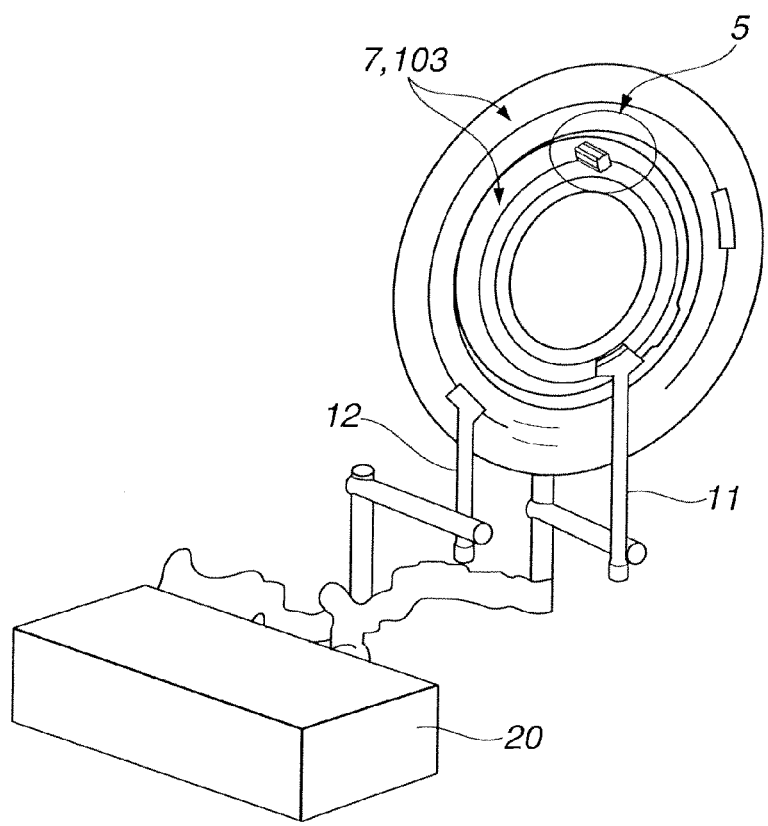
FIGS. 3A and 3B are schematic diagrams showing a passage system of the automatic transmission for supplying working oil to a cylinder chamber of the frictional engagement member of FIG. 2.
Figure 3B:
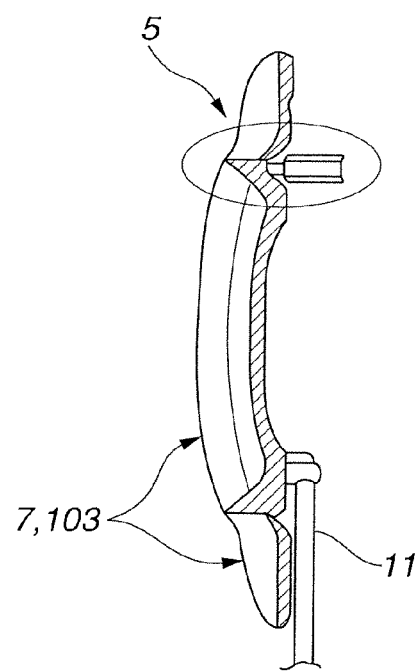

FIGS. 3A and 3B are schematic diagrams showing a passage system of the automatic transmission for supplying working oil to the cylinder chamber of frictional engagement member 1. The passage system is depicted without other arrangement of the automatic transmission. The passage system extends from a control valve unit 20 which generates control hydraulic pressures, to frictional engagement member 1. Control valve unit 20, in which solenoid valve 2 and control valve 3 are installed, outputs hydraulic pressure which is supplied through an oil passage 11 and an oil passage 12 formed in transmission housing 10, and supplied as engagement pressure to the cylinder chamber of frictional engagement member 1.

As shown in FIGS. 3A and 3B, hydraulic pressure is supplied from control valve unit 20 and sent upwardly through the oil passage 11 toward the cylinder chamber. The supplied working oil enters and fills gradually the inside space from below the cylinder chamber and finally fills the inside space completely. As the level of working oil rises gradually, air is pushed up by the working oil to move upward accordingly, and then reach the air vent opening 5, and then exit through the air vent opening 5. If the hydraulic pressure control signal is initially set to a high hydraulic pressure command value for quickly venting air, it is possible that working oil is stirred or agitated in the cylinder chamber, because the cylinder chamber is filled with air and the resistance to flow is low at the moment before the supply of working oil is started. This may cause a problem that oil is blown upward before air is blown upward, and is adhered to the air vent opening 5 before air vent, so that the adhered oil prevents outflow of air through the air vent opening 5. This problem is addressed by the present embodiment in which the hydraulic pressure control signal is set initially to a lower hydraulic pressure value than a normal higher hydraulic pressure value that is preset for air vent operation. This feature serves to prevent oil from being adhered to and blocking the air vent opening 5.

Figure 4:
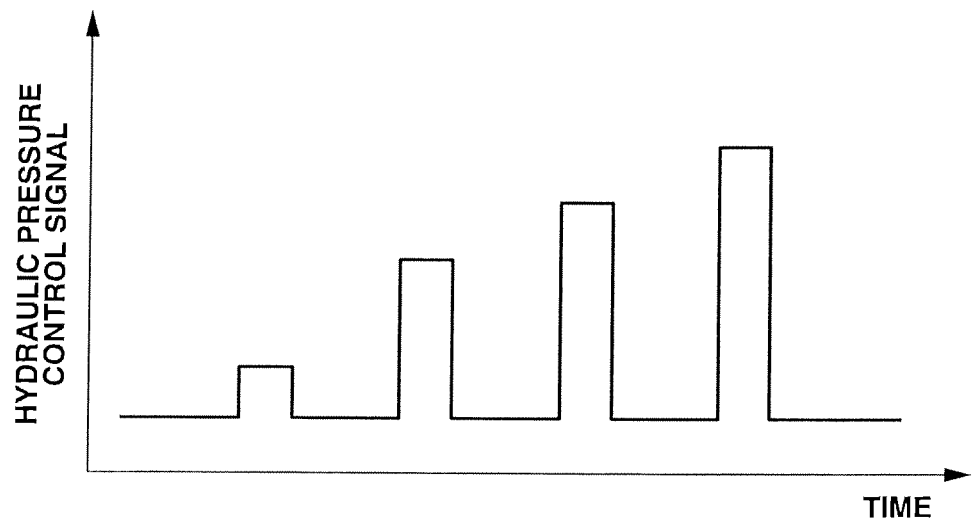
FIG. 4 is a time chart showing a first example of how a hydraulic pressure control signal indicative of a hydraulic pressure command value is set by an air vent control section of the automatic transmission controller according to the present embodiment.

FIG. 4 is a time chart showing a first example of how the hydraulic pressure control signal indicative of hydraulic pressure command value is set by the air vent control section of the automatic transmission controller according to the present embodiment. As shown in FIG. 4, the hydraulic pressure control signal is outputted in the form of a plurality of pulses indicative of hydraulic pressure command values. The hydraulic pressure control signal is set so that the hydraulic pressure command value increases gradually with time. In other words, the air vent operation includes: a preliminary operation of setting the hydraulic pressure control signal to a preliminary pulse indicative of a preliminary value of pressure, wherein the preliminary value is lower than a normal value of pressure; and a normal operation of setting the hydraulic pressure control signal to a normal pulse indicative of the normal value, wherein the normal pulse follows the preliminary pulse. In further other words, the air vent operation includes: a first operation of setting the hydraulic pressure control signal to a first pulse indicative of a first value of pressure, wherein the first value is lower than a second value of pressure, wherein the first pulse is prior to any other pulse of the hydraulic pressure control signal; and a second operation of setting the hydraulic pressure control signal to a second pulse indicative of the second value, wherein the second pulse is immediately subsequent to the first pulse. The normal value of the hydraulic pressure control signal is set so that under control based on the normal value, suitable hydraulic pressure can be produced in the cylinder chamber to vent air within a predetermined time period. It is to be noted that the normal value of pressure is not identical to an actual hydraulic pressure value.

When working oil is supplied from control valve unit 20 to the cylinder chamber, the feature described above serves to allow the oil chamber to be filled with working oil while preventing the air vent opening 5 from being blocked by working oil, and thereby allowing air to be vented through the air vent opening 5, which air is left in the hydraulic circuit system that supplies hydraulic pressure to frictional engagement member 1. When the second pulse of hydraulic pressure is supplied, the cylinder chamber is already supplied with some amount of oil by the first pulse of hydraulic pressure, so that the amount of air in the cylinder chamber is relatively small and working oil is prevented from being stirred or agitated in the cylinder chamber even when the hydraulic pressure control signal is set to a high hydraulic pressure command value.

Figure 5:
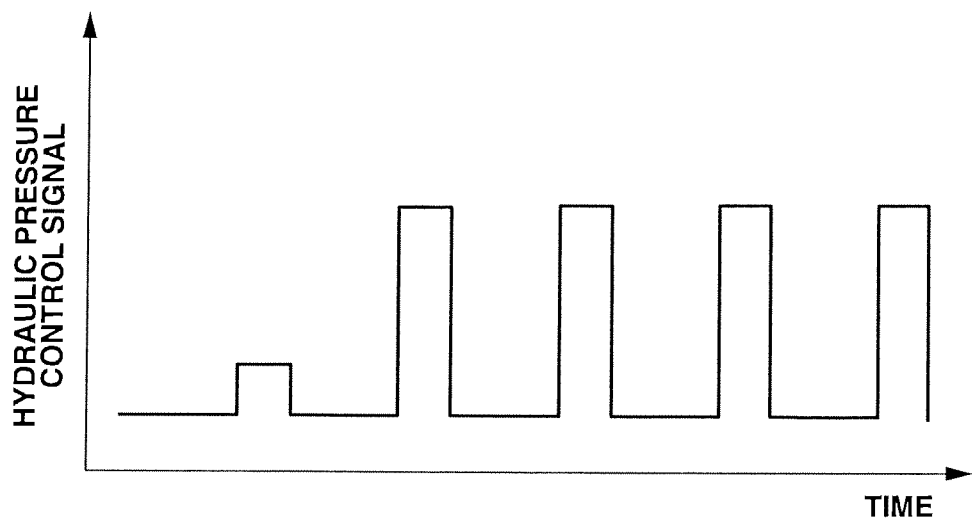
FIG. 5 is a time chart showing a second example of how the hydraulic pressure control signal is set by the air vent control section of the automatic transmission controller according to the present embodiment.

FIG. 5 is a time chart showing a second example of how the hydraulic pressure control signal is set by the air vent control section of the automatic transmission controller according to the present embodiment. As shown in FIG. 5, the first pulse of the hydraulic pressure control signal is set to a lower value of pressure, and then the second and following pulses are set to a constant value of pressure that is higher than that of the first pulse. This example also produces similar advantageous effects as the example of FIG. 4.

The following summarizes the features of the automatic transmission controller according to the present embodiment and advantageous effects produced by the automatic transmission controller.

<1> An automatic transmission controller for an automatic transmission provided with a frictional engagement member (1), wherein the frictional engagement member (1) is configured to be operated by hydraulic pressure (Pc) for shifting the automatic transmission, and includes an air vent opening (5), the automatic transmission controller includes: a pressure regulator (solenoid valve 2, control valve 3) configured to regulate the hydraulic pressure (Pc) in response to a hydraulic pressure control signal; and a control section (air vent control section of automatic transmission control unit 4) configured to set the hydraulic pressure control signal, and perform an air vent operation of venting air from the frictional engagement member (1) through the air vent opening (5), wherein the air vent operation includes: a preliminary operation of setting the hydraulic pressure control signal to a preliminary pulse indicative of a preliminary value of pressure, wherein the preliminary value is lower than a normal value of hydraulic pressure; and a normal operation of setting the hydraulic pressure control signal to a normal pulse indicative of the normal value, wherein the normal pulse follows the preliminary pulse. This feature serves to suppress movement of working oil which is supplied to the cylinder chamber for generating the engagement pressure of frictional engagement member 1, and thereby prevent the air vent opening (5) from being blocked by working oil before venting air through the air vent opening (5). When the preliminary operation is completed, some amount of air is vented from the cylinder so that the amount of air in the cylinder is relatively small, and movement of working oil is suppressed. Thereafter, it is possible to allow air to be vented through the air vent opening (5) while preventing the air vent opening (5) from being blocked by working oil, even when the internal pressure is raised during the normal operation.

<2> The automatic transmission controller is configured so that the air vent operation includes: a first operation of setting the hydraulic pressure control signal to a first pulse indicative of a first value of pressure, wherein the first value is lower than a second value of pressure, wherein the first pulse is prior to any other pulse of the hydraulic pressure control signal; and a second operation of setting the hydraulic pressure control signal to a second pulse indicative of the second value, wherein the second pulse is immediately subsequent to the first pulse. When the second pulse of hydraulic pressure is supplied, the cylinder chamber is already supplied with some amount of oil by the first pulse of hydraulic pressure, so that the amount of air in the cylinder chamber is relatively small and working oil is prevented from being stirred or agitated in the cylinder chamber even when the hydraulic pressure control signal is set to a high hydraulic pressure command value. The feature of setting the hydraulic pressure control signal to the high hydraulic pressure command value serves to quickly complete the air vent.

<3> The automatic transmission controller is configured so that the air vent operation is implemented by setting the hydraulic pressure control signal to pulses gradually increasing with time. In other words, the automatic transmission controller is configured so that: the preliminary operation is a first preliminary operation of setting the hydraulic pressure control signal to a first preliminary pulse indicative of a first preliminary value of pressure, wherein the first preliminary value is lower than the normal value; and the air vent operation includes a second preliminary operation of setting the hydraulic pressure control signal to a second preliminary pulse indicative of a second preliminary value of pressure, wherein the second preliminary pulse is prior to the normal pulse and subsequent to the first preliminary pulse, wherein the second preliminary value is lower than the normal value and higher than the first preliminary value. This feature serves to complete the air vent while stabilizing the condition of working fluid in the cylinder chamber.

<4> The automatic transmission controller is configured so that the air vent operation is implemented by to setting the hydraulic pressure control signal to pulses constant with time after the first pulse. In other words, the automatic transmission controller is configured so that: the second value is equal to the normal value; and the air vent operation includes a third operation of setting the hydraulic pressure control signal to a third pulse indicative of the normal value, wherein the third pulse follows the second pulse. The feature serves to quickly complete the air vent.

The present embodiment may be modified in various manners. Although frictional engagement member 1 is a brake in the present embodiment, frictional engagement member 1 may be a clutch or the like. The present embodiment is not limited to the automatic transmission but may be applied to a start clutch provided with a cylinder chamber to be filled with working oil. Although air vent member 6 is composed of central part 61 and projections 62 in the present embodiment, air vent member 6 may be simply composed of central part 61 only without projections 62. In such a case, the diameter of air vent member 6 is set slightly smaller than that of air vent member insertion hole 102, forming a passage of air which has an annular cross-section. In such a case, an additional swaging member is provided at the outlet side of air vent member insertion hole 102 for preventing the air vent member 6 from dropping from air vent member insertion hole 102.

The entire contents of Japanese Patent Application 2011-232847 filed Oct. 24, 2011 are incorporated herein by reference.

Although the invention has been described above by reference to certain embodiments of the invention, the invention is not limited to the present embodiments described above. Modifications and variations of the present embodiments described above will occur to those skilled in the art in light of the above teachings. The scope of the invention is defined with reference to the following claims.

What is claimed is:

1. An automatic transmission controller for an automatic transmission provided with a frictional engagement member, wherein the frictional engagement member is configured to be operated by hydraulic pressure for shifting the automatic transmission, and includes an air vent opening, the automatic transmission controller comprising:
   a pressure regulator configured to regulate the hydraulic pressure in response to a hydraulic pressure control signal; and
   a control section configured to set the hydraulic pressure control signal, and perform an air vent operation of venting air from the frictional engagement member through the air vent opening, wherein the air vent operation includes:
      a preliminary operation of setting the hydraulic pressure control signal to a preliminary pulse indicative of a preliminary value of pressure, wherein the preliminary value is lower than a normal value or second value of pressure;
      wherein the preliminary pulse is prior to any other pulse of the hydraulic pressure control signal; and
      a normal operation of setting the hydraulic pressure control signal to a normal pulse indicative of the normal value, wherein the normal pulse follows the preliminary pulse,
   the normal operation comprises a second operation of setting of the hydraulic pressure control signal to a second pulse indicative of the second value, wherein the second pulse is immediately subsequent to the preliminary pulse, and
   wherein the air vent operation is implemented by setting the hydraulic pressure control signal to pulses constant with time after the preliminary pulse.

2. The automatic transmission controller as claimed in claim 1, wherein:
   the second value is equal to the normal value; and
   the air vent operation includes a third operation of setting the hydraulic pressure control signal to a third pulse indicative of the normal value, wherein the third pulse follows the second pulse.

3. An automatic transmission control method for an automatic transmission provided with a frictional engagement member, wherein the frictional engagement member is configured to be operated by hydraulic pressure for shifting the automatic transmission, and includes an air vent opening, wherein the automatic transmission is provided with a pressure regulator configured to regulate the hydraulic pressure in response to a hydraulic pressure control signal, the automatic transmission control method comprising:
   performing by a controller an air vent operation of venting air from the frictional engagement member through the air vent opening, wherein the air vent operation includes:
      a preliminary operation of setting the hydraulic pressure control signal to a preliminary pulse indicative of a preliminary value of pressure, wherein the preliminary value is lower than a normal value or second value of pressure;
      wherein the preliminary pulse is prior to any other pulse of the hydraulic pressure control signal; and
      a normal operation of setting the hydraulic pressure control signal to a normal pulse indicative of the normal value, wherein the normal pulse follows the preliminary pulse,
   the normal operation comprises a second operation of setting of the hydraulic pressure control signal to a second pulse indicative of the second value, wherein the second pulse is immediately subsequent to the preliminary pulse,
   wherein the air vent operation is implemented by setting the hydraulic pressure control signal to pulses constant with time after the preliminary pulse.

4. The automatic transmission control method as claimed in claim 3, wherein:
   the second value is equal to the normal value; and
   the air vent operation includes a third operation of setting the hydraulic pressure control signal to a third pulse indicative of the normal value, wherein the third pulse follows the second pulse.

* * * * *